United States Patent

[11] 3,547,301

[72] Inventor Roger Cambridge Ffooks
 Tittlesfold Farm, near Billingshurst, Sussex, England
[21] Appl. No. 794,149
[22] Filed Jan. 27, 1969
[45] Patented Dec. 15, 1970
[73] Assignee Conch Ocean Limited
 Nassau, a
 Bahamian company
[32] Priority Feb. 21, 1968
[33] Great Britain
[31] No. 8362/68

[54] TANKER FOR LIQUEFIED GASES
 7 Claims, 3 Drawing Figs.
[52] U.S. Cl. ................................................. 220/10;
 114/74
[51] Int. Cl. ................................................. B65d 7/22
[50] Field of Search ................................. 220/9A, 9B,
 9F, 10, 15; 114/74A

[56] References Cited
UNITED STATES PATENTS

| 2,804,657 | 9/1957 | Munters | 220/9(B)UX |
| 3,047,184 | 7/1962 | Van Bergen et al. | 220/9(A) |
| 3,118,559 | 1/1964 | Stricker, Jr. | 220/9(B) |
| 3,341,049 | 9/1967 | Forman et al. | 220/9(F) |

Primary Examiner—Joseph R. Leclair
Assistant Examiner—James R. Garrett
Attorney—Max L. Libman ABSTRACT: To prevent infiltration of external leakage water into the major portion of the water-permeable thick outer thermal insulation of the cargo tanks of marine tankers for cryogenic liquids, interceptor drainage passages are formed in the outer part of the thermal insulation so that such leakage water is drained down to a sump for collection and removal before the water can reach a thermal gradient in the insulation at which it will freeze.

PATENTED DEC 15 1970

Inventor
Roger C. Ffooks
By Max L. Libman
Attorney

TANKER FOR LIQUEFIED GASES

This invention relates to an improvement in marine tankers of the kind used for the overwater transportation of cold liquids such as liquefied gases at near atmospheric pressure and low temperature.

In such a tanker the cold liquid is contained in tanks located in thermally insulated cargo holds in the tanker. The tanks are of one of two distinct types. In one type, the tank is a self-supporting tank, that is to say one having sufficient structural strength to hold the liquid within the tank and withstand the hydrostatic pressures and inertia forces, without depending upon any other means outside the tank for aid in supporting the walls of the tank against buckling. The tank is of a material, e.g. metal, which is not subject to cold embrittlement at the temperature met in use, for example, the temperature of liquefied natural gas. The tank is thermally insulated externally by thermal insulation which either directly encases the tank or lines the cargo hold of the tanker so as to define a containing space within which the tank is located, with or without a gap between its exterior surface and the interior surface of the insulation.

The other type of tank is known as an integrated container and comprises a housing of solid load-bearing thermal insulation internally lined with a thin and flexible fluidtight membrane tank of sheet material, e.g. metal, which is not subject to cold embrittlement at the temperature which will be encountered in use and which is not self-supporting but is supported, against internal loads due to hydrostatic pressures and inertial forces, by the surrounding solid insulation. The insulation lines and is itself supported by, the rigid cargo hold so that the insulation directly transmits to the cargo hold all the pressure exerted by the fluid upon the walls of the membrane tank.

Usually such tankers each have a double hull and the inner hull is divided by transverse bulkheads so as to divide the hull into individual cargo holds. The space between the hulls, and possibly also the transverse bulkheads, is divided into tanks to contain water. Such water is provided for two purposes. One purpose is to serve as ballast for trimming and safe operation of the ship. In this regard it is to be noted that in the case of a tanker for transporting liquefied gases, which are of low density, at least some ballast water may be provided in at least some of the ballast tanks even when the cargo tanks are full of liquid cargo. The second purpose is that, should there be a failure of the insulation, the ballast tank adjacent the part of the inner hull in the neighborhood of the affected part of the insulation can be filled with water in order to prevent the steel of the inner hull from being cooled below the safe level.

A problem encountered in such tankers is that, should a leak develop in the wall of a ballast tank, then water will penetrate into a cargo hold, and even into and through the insulation therein which will usually be partially water-permeable. The penetration of water into the cargo hold may build up a head of pressure behind the insulation forcing it away from the wall of the cargo hold towards the cargo tank. Thus a known thermal insulation within the hold of a ship comprises blocks or panels, for example of balsa wood faced with plywood. These panels are mounted by securing them to spaced securing strips, e.g. of wood, which are secured to the walls of the cargo hold. In such a construction a head of pressure of leaking water may be sufficient to force the panels off the mounting strips.

There is, of course, a thermal gradient across the thickness of the insulation so that water penetrating through the insulation towards the tank will progressively become colder and, if it arrives at a location below the freezing point of water, it will freeze. Accordingly, ice will build up within the thickness of the insulation. A serious difficulty then arises in that ice has a greater coefficient of thermal conductivity than the thermal insulation so that the thermal insulating properties of the insulation are prejudiced and heat will be transmitted more readily to the tank resulting in greater evaporation of the cargo and the hull will become cold. Moreover, in the case of a membrane tank ice may form between the membrane tank and the insulation thereby forcing a portion of the membrane away from the insulation and overstressing this portion of the membrane so that fracture may occur.

The aim of the present invention is to overcome these problems and provide a tanker having at least one container for very cold liquids, comprising a tank of either type specified above, in which the possibility of a buildup of water between the tank and the cargo hold in which it is located is avoided or considerably reduced.

In accordance with the present invention there is provided a tanker for the transportation of cold liquids, said tanker comprising at least one fluidtight tank located in a hold and externally insulated by thermal insulation between said tank and the walls of said hold, the outer parts of said thermal insulation, adjacent to said walls, being formed with passages through which any water present may pass freely substantially parallel to the walls of said tank towards the bottom of the hold, means adjacent to the bottom of the hold for collecting such water and a pump or equivalent means for removing the water so collected.

The idea of the invention is that, should a leak occur in a ballast tank resulting in water flowing into the cargo hold, instead of, as previously, collecting between the wall of the cargo hold and the insulation, the water can flow freely through the passages provided and can be collected at the bottom of the cargo hold where its presence can be readily detected by conventional means and it can be removed by a pump.

Because the water can continuously flow it is less likely to freeze thus overcoming the problems presented by the formation of ice.

The water could be collected in a tray disposed immediately below the bottom of the tank. Preferably, however, the water is collected in part of the inner hull constituting the bottom of the cargo hold.

Preferably, the outer parts of the thermal insulation, adjacent the walls of the cargo hold and formed with passages, are constituted by a series of ground or furring strips, which are fixed to the walls of the cargo hold and to which the remainder of the thermal insulation is secured. The passages may be constituted by holes or slots or rebates formed in the strips or by gaps defined between the strips.

The relatively thick layer constituting the remainder of the insulation may be of any appropriate form. It may be in the form of blocks of balsa wood faced with plywood, with the gaps therebetween sealed by compressed plastic material all for example, as disclosed in U.S. Pat. No. 3,112,043, constituting a secondary barrier against leakage of cryogenic liquid.

In any event the insulation will be relatively impermeable to water. In accordance with a further feature of the invention, the insulation is rendered more impermeable or liquidtight by the application of a surface coating to that surface facing the walls of the cargo hold. This water-resistant coating may be of any suitable material as, for example, resin, paint, closed-cell polyurethane and like materials.

In order that the invention may be more clearly understood two specific constructional examples will now be described with reference to the accompanying drawings, wherein.

Corresponding components in the different figures are designated by the same references throughout these figures.

Figure 1:
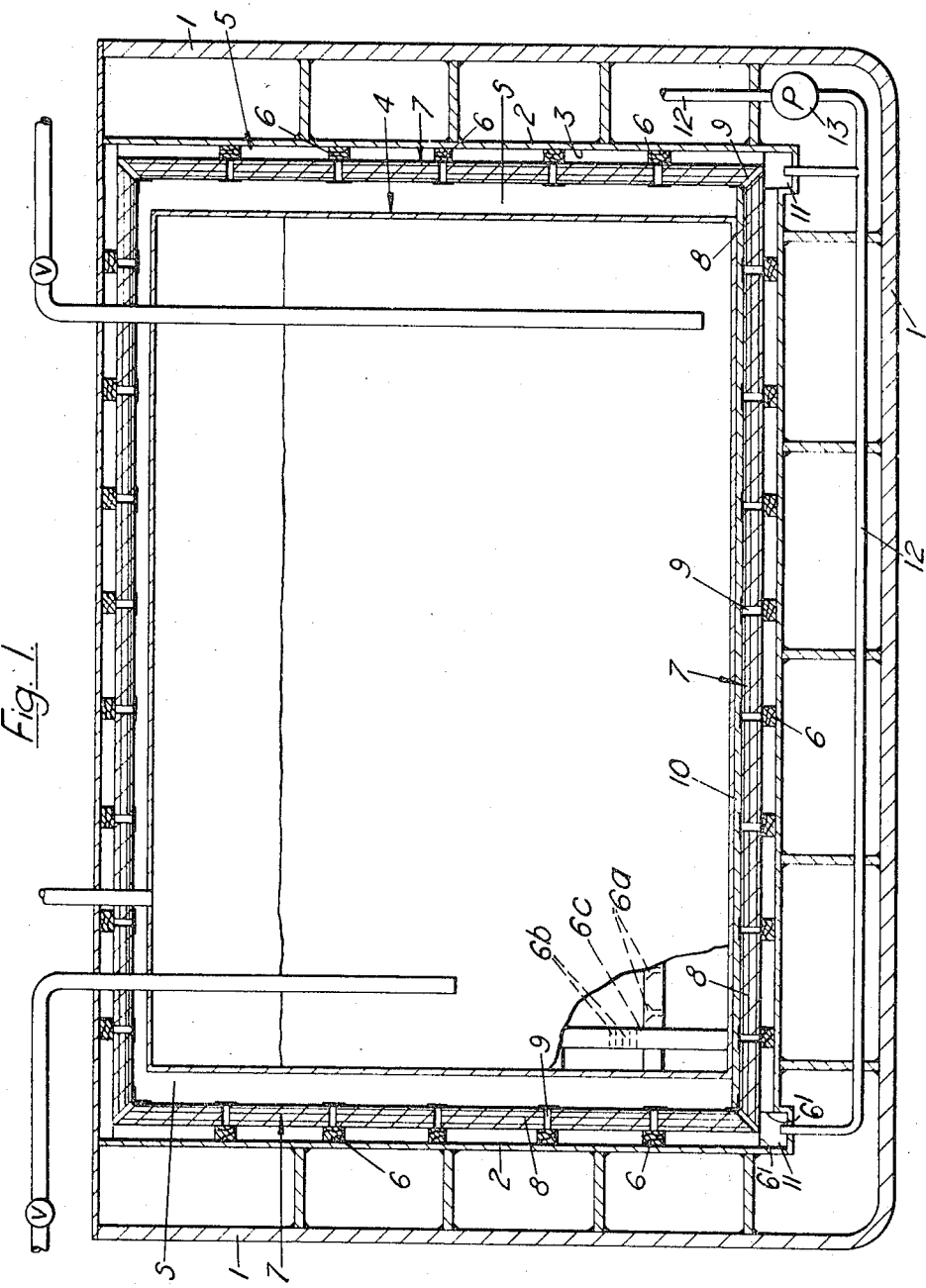
FIG. 1 is a vertical cross-sectional view through a marine tanker incorporating a freestanding cargo tank.

In FIG. 1 there is shown a marine tanker having an outer hull 1 and an inner hull 2. Disposed within a cargo hold 3 defined within the inner hull and transverse bulkheads is a self-supporting tank indicated generally at 4. This is of aluminum, a metal which is not subject to cold embrittlement and of sufficient thickness and suitably stiffened to contain the liquid. A suitable alternative to aluminum is 9 percent nickel steel. The tank is surrounded by thermal insulation, generally designated 5, which lines the cargo hold 3. There is a space S all around the tank between the exterior surface of the tank 4 and the internal surface of the insulation 5.

The thermal insulation comprises a plurality of timber furring strips 6, 6' attached at regular intervals to the cargo hold and some of which in section at 6 extend horizontally and some of which, as indicated at 6', extend vertically. The furring strips 6 also extend longitudinally along the bottom and strips 6' extend transversely. Mounted upon the strips is a relatively thick layer 7 of the thermal insulation which is in the form of panels 8 of balsa wood faced with plywood, with the gaps therebetween sealed by compressed plastic material 9, all for example, as disclosed in U.S. Pat. No. 3,112,043, constituting a secondary barrier against leakage of liquid cargo. Interposed between the bottom of the tank and the panels 8 is a layer of balsa wood 10.

Figure 3:
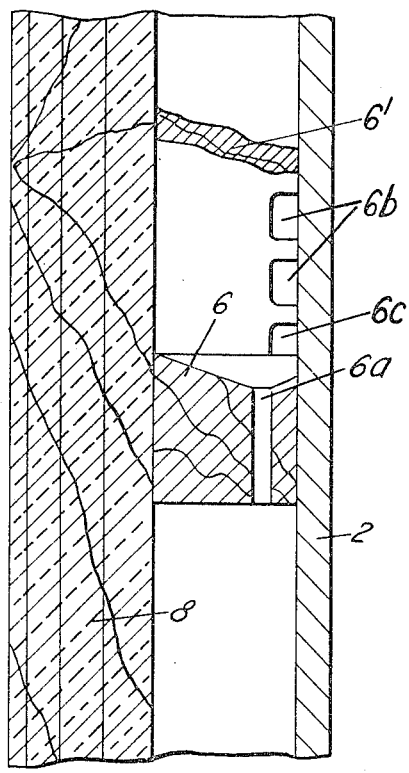
FIG. 3 is a detail sectional view through one of the furring strips of FIG. 1 or 2.

In accordance with the present invention, the horizontal strips 6 and vertical strips 6' adjacent the side walls and the transverse and longitudinal strips 6, 6' below the bottom of the tank are formed with apertures 6a, slots 6b or rebates 6c as shown in FIG. 3 permitting the water to pass through the strips. While the apertures 6a in the horizontal strips 6 would be sufficient to cope with a small leak, the slots 6b and rebates 6c in the vertical strips 6' are added to cope with larger leaks, to expedite the flowing away of water from a local leak, horizontally as well as vertically. Furthermore, it may be desirable after such a leak has been remedied, to circulate dry air through the space and the multiplicity of apertures, slots and rebates is an advantage in facilitating this step.

In this example the bottom of the inner hull 2 is itself employed as a water receptacle. Accordingly the bottom of the inner hull 2 is formed at the after end of the vessel with sumps 11 in the bottom for the collection of water. The water can be automatically removed through pipes 12 by a pump 13 located between the inner and outer hulls.

Thus, the arrangement is such that, should any leak occur in the inner hull or a transverse bulkhead water will flow into the cargo hold 3. But, instead of, as previously, collecting in the spaces defined between the wall of the cargo hold 3, the inner face of the panels 8 and adjacent mounting strips 6, the water can flow freely through the strips 6 and be collected at the bottom of the cargo hold where its presence can be readily detected by conventional means and it can be removed through pipe 12 by pump 13. In this manner the generation of any head of water is prevented and the danger of damage to the insulation is minimized. The panels 8, with the sealing material 9 therebetween are relatively water-impervious. Some of the water may freeze. If it is desired to prevent this the arrangement proposed in accordance with the invention disclosed in U.S. Pat. application Ser. No. 769,650 of R. G. Jackson, filed Oct. 22, 1968 may be adopted. In accordance with that invention a thin continuous film is interposed between the inner hull 2 and the panels 8. In any event, a readily-pervious insulation such as glass fiber may be interposed in the spaces between adjacent strips 6 between the cargo hold and panels 8.

Figure 2:
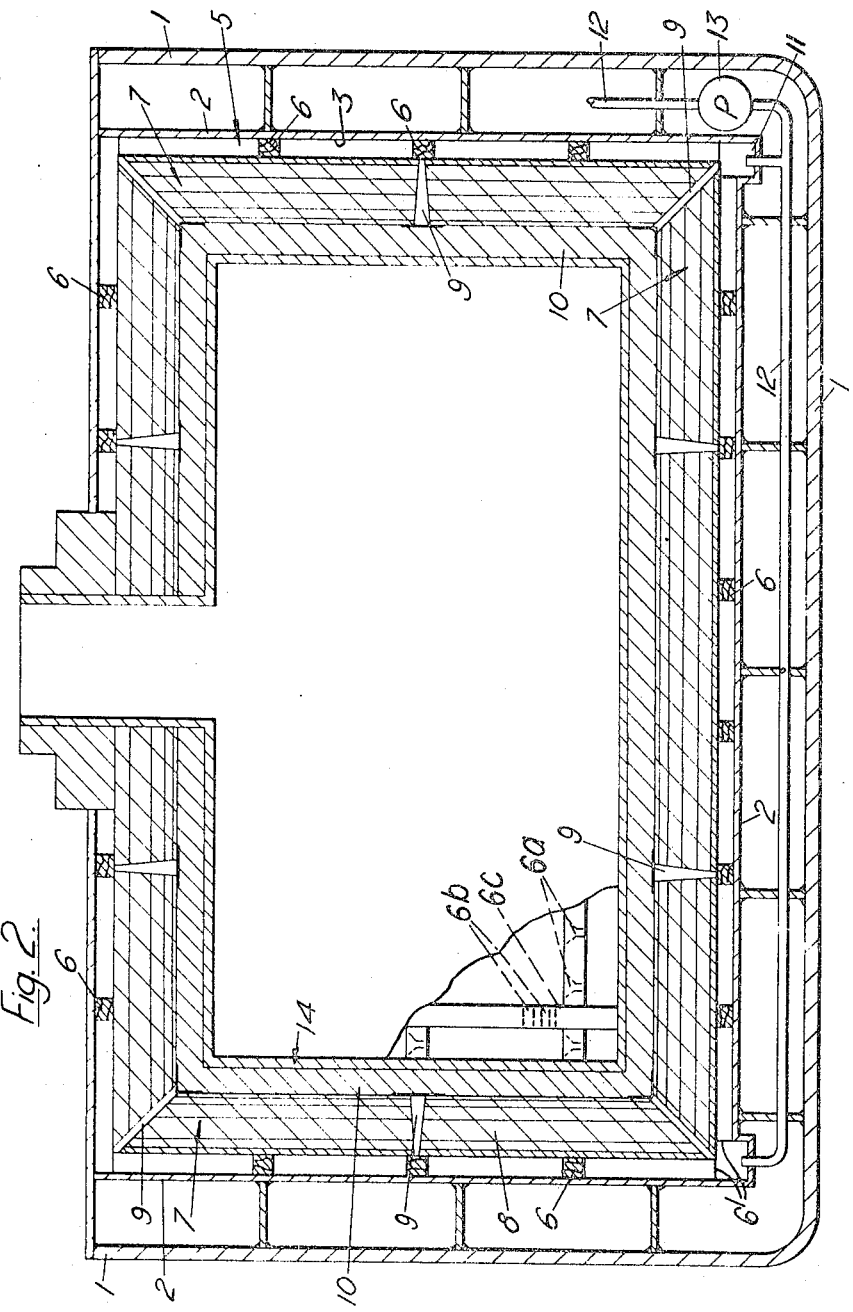
FIG. 2 is a vertical cross-sectional view through a marine tanker incorporating a membrane cargo tank.

In FIG. 2 there is shown a marine tanker having an outer hull 1 and an inner hull 2. In this case there is disposed within a cargo hold 3 defined within the inner hull and transverse bulkhead a membrane tank indicated generally at 14. This is of thin sheets of 18/8 stainless steel, another example of metal which is not subject to cold embrittlement. The tank is surrounded and supported against hydrostatic loads and inertia forces by the thermal insulation, generally designated at 5, which lines the cargo hold 3.

The thermal insulation 5 as in FIG. 1, comprises a plurality of timber furring strips 6, 6' attached as previously described. Mounted upon the strips is a relatively thick layer 7 of the thermal insulation which is in the form of blocks of balsa wood 8, faced with plywood, as previously described.

The horizontal strips 6 adjacent the side walls and the longitudinal strips 6 below the bottom of the tank are formed with slots or apertures 6a, slots 6b or rebates 6c as shown in FIG. 3 permitting the water to pass through the strips.

In these examples, as in FIG. 1, the bottom of the inner hull 2 is itself employed as a water receptacle. Accordingly the bottom of the inner hull 2 is formed with sumps 11 adjacent the side walls for the collection of water. The water can be automatically detected and removed through pipes 12 by a pump 13 located between the inner and outer hulls. The arrangement is as previously described. If it is desired to prevent freezing of water the arrangement proposed in accordance with the invention disclosed in U.S. Pat. application Ser. No. 769,650 may be adopted.

I claim:

1. a. A marine tanker for the transportation of cryogenic liquids including:
   b. at least one fluidtight tank located in a hold of said tanker;
   c. a thick layer of external insulation lining the outside of said tank adjacent a wall of the hold;
   d. the outer part of said thick layer of insulation adjacent said wall being formed with drainage passages through which any accumulated water can pass freely substantially parallel to the wall of the tank toward the bottom of the hold, without penetrating deeply into said thick layer of insulation; and
   e. means adjacent to the bottom of the hold for collecting such water and removing same from the space between the tank and the wall of the hold.

2. A tanker according to claim 1, including a sump near the bottom of said tank for collecting the water, and a pump for removing the water so collected from the space between the tank and the wall of the hold.

3. A tanker according to claim 2, comprising a framework of vertical and horizontal furring strips secured to the inner surface of the hold and serving to support the thermal insulation, said strips being slotted adjacent to the walls of the hold for the passage of water.

4. A tanker according to claim 3 wherein the spaces defined between the furring strips, the wall of the hold and the thermal insulating layer are filled with a readily permeable thermal insulating material.

5. A tanker according to claim 1, comprising a surface coating of water-impermeable material on the surface of the thermal insulating layer facing the wall of the hold.

6. A tanker according to claim 1 wherein the fluidtight tank is a self-supporting tank spaced, when the tank is loaded, from the inner surface of the thermal insulation.

7. A tanker according to claim 1 comprising a fluidtight tank formed of thin and flexible membrane material in contact with the surrounding thermal insulation and supported thereby against internal loads.